June 24, 1969  F. GROSSOEHME  3,452,268
A.C.-D.C. RECTIFIER INCLUDING A MAGNETIC AMPLIFIER
FOR REGULATING THE A.C. INPUT FOR THE RECTIFIER
Filed Dec. 29, 1966

INVENTOR.
FLOYD GROSSOEHME
BY
ATTORNEY

United States Patent Office 3,452,268
Patented June 24, 1969

3,452,268
A.C.-D.C. RECTIFIER INCLUDING A MAGNETIC AMPLIFIER FOR REGULATING THE A.C. INPUT FOR THE RECTIFIER
Floyd Grossoehme, Cincinnati, Ohio, assignor to General Electric Company, a corporation of New York
Filed Dec. 29, 1966, Ser. No. 605,714
Int. Cl. H02m 1/08, 7/02
U.S. Cl. 321—18                                                1 Claim

ABSTRACT OF THE DISCLOSURE

The disclosure shows a circuit for regulating the output voltage of a rectifier. Flow of current through the control winding of a magnetic amplifier input to the rectifier is regulated by a transistor circuit including a Zener diode which provides a reference voltage.

---

Figure 1:
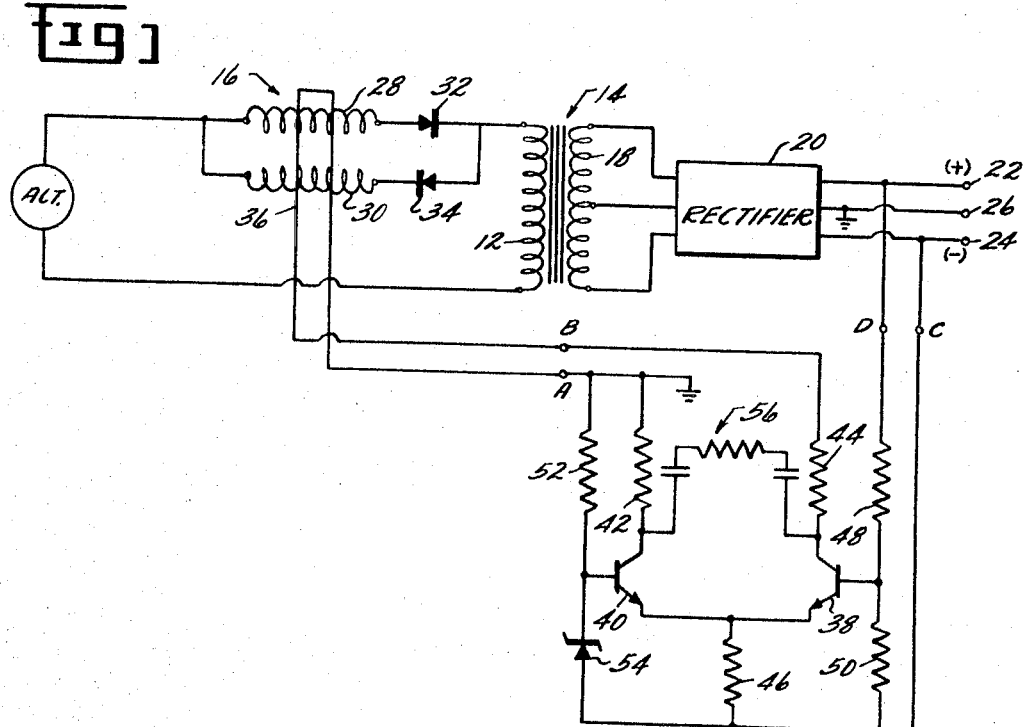

The present invention relates to improvements in the regulation of the direct current output voltage of a rectifier.

The need for regulating or maintaining constant, the direct current potential between the output terminals of a rectifier has long been recognized and many circuits provided for that purpose. However, few such circuits are capable of providing effective regulation where the alternating current varies widely in frequency and voltage. This problem is particularly exemplified in control systems for gas turbine engines where the alternating current is derived from an alternator driven by the engine rotor. It is necessary that a direct current supply be available for the engine controls when the engine rotor is at as low as 30% of its maximum speed. This means that there will be a ratio of almost 4 to 1 in the frequency and voltage input to the rectifier powered by the engine-driven alternator.

Up to the present time the best known solution to economically providing regulation of a rectifier output under such conditions has been to employ a magnetic amplifier for regulating the alternating current flow to the rectifier and thereby providing a "coarse" regulation of the direct current supply. The magnetic amplifier, in turn, is effective as a function of current flow through a control winding. This latter function has involved the use of silicon-controlled rectifiers. While such regulators have proved satisfactory, nonetheless there are limitations, particularly where gas turbine engines are used for the propulsion of aircraft. Silicon-controlled rectifiers create noise or extraneous signals which must be filtered or otherwise blocked so as not to interfere with operation of other electrical circuits for the engine and aircraft. Further problems are encountered in providing the desired level of accuracy over wide temperature ranges required for aircraft operation. Thus, even though a fine voltage regulator may be employed to maintain a highly accurate voltage supply for control purposes, if the output voltage of the rectifier, as controlled by the "coarse" regulator, varies to a substantial degree, it requires a large amount of heat to be dissipated in the fine voltage regulator. At high speed flight conditions in particular heat dissipation of any sort is an acute problem.

The object of the invention, therefore, is to provide an improved, economical, "coarse" voltage regulator for controlling or regulating the direct current potential between the output terminals of a rectifier and in so doing to overcome the limitations of prior art devices for such purposes.

These ends are attained by providing a magnetic amplifier for controlling alternating current flow to a rectifier. The control winding of the magnetic amplifier is incorporated in a circuit which includes a voltage divider connected across the direct current output terminals of the rectifier and reference voltage means, preferably including a Zener diode, connected in parallel with a portion of the voltage divider to provide a reference voltage. Means responsive to changes in the potential drop across the selected portion of the voltage divider from the value of the voltage drop across the Zener diode are employed to change current flow through the control winding in a direction which will return the voltage drop across the selected portion of the voltage divider to the reference voltage by increasing or decreasing the alternating current input to the rectifier. The potential between the output terminals of the rectifier is thus regulated to a predetermined multiple of the reference voltage, thus enabling the use of a highly accurate reference voltage and, more specifically, a highly accurate Zener diode, which can be repeatably obtained at a relatively low cost.

The current flow control means preferably take the form of a differential amplifier employing a pair of matched transistors so that the changes in base-emitter voltage drop or gain in the transistors due to temperature variations are effectively nulled out and accurate voltage regulation may be had over an extremely wide temperature range.

The above and other related objects and features of the invention will be apparent from a reading of the following description of the disclosure found in the accompanying drawing and the novelty thereof pointed out in the appended claim.

Figure 2:
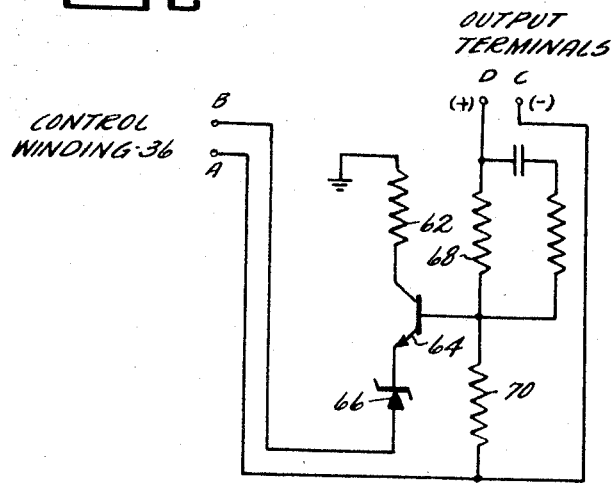

In the drawing:

FIGURE 1 is a schematic of a voltage-regulating circuit embodying the present invention; and FIGURE 2 is a schematic of a modified embodiment of the invention.

The output of an alternator 10, FIGURE 1, is connected in series with the primary 12 of a transformer 14 and a magnetic amplifier 16. The secondary 18 of the transformer is connected to a rectifier 20 to provide a direct current output at positive and negative terminals 22, 24, relative to a ground terminal 26. The voltage across the terminals 22 and 24 is regulated by the magnetic amplifier 16 in a manner which will now be described.

The magnetic amplifier comprises gate windings 28 and 30 connected in parallel and each having oppositely poled diodes 32, 34 respectively connected in series therewith to provide a full wave output from the magnetic amplifier. Current flow through a control winding 36 regulates the current and voltage passing through the magnetic amplifier 16 in the usual fashion of a magnetic amplifier.

The control winding 36 is connected from terminal A to ground and from terminal B to a resistor 44 and the collector of a transistor 38. Transistor 38 in combination with a second transistor 40 form a differential amplifier. The latter transistor has a collector resistor 42 connected in series to ground. The resistor 42 has the same value as resistor 44. The emitters of the transistors 38 and 40 are connected through a common resistor 46 to the negative output terminal 24 through a terminal C.

The base of transistor 38 is connected intermediate voltage dividing resistors 48 and 50, which are connected in series across the positive terminal 22 (through terminal D) and negative terminal 24.

The base of transistor 40 is connected intermediate a resistor 52 and a Zener diode 54. The Zener diode is connected to the negative terminal 24 and the resistor 52 is connected to ground.

A resistive capacity circuit 56 interconnects the collectors of the transistors 38 and 40 for purposes of stability in a known fashion for such differential amplifiers.

There are four current flow paths of interest in the present circuit. They are:

(a) From ground through resistor 52 and Zener diode 54 to the negative terminal 24. This flow path establishes the potential at the base of transistor 40.

(b) From ground through resistor 42, transistor 40, and resistor 46, to the negative terminal 24.

(c) From ground through the control winding 36, resistor 44, transistor 38, and resistor 46 to the negative output terminal 24.

(d) From the positive terminal 22 through resistors 48 and 50 to the negative output terminal 24. This establishes the potential at the base of the transistor 38.

Assuming that the potential between the negative output terminal 24 and ground is sufficient to cause the Zener diode 54 to be conductive, a predetermined potential is established at the base of the transistor 40, due to the known characteristics of Zener diodes. Assuming a stable condition, the base of the transistor 38 will be biased to this same potential, as the voltage drop across the resistor 50 matches that across the Zener diode 54. Current flow through the control winding 36 is established at the desired value, giving a predetermined output voltage across the positive and negative terminals 22 and 24, which is a multiple of the reference voltage drop across the Zener diode 54. Thus the selected voltage drop across the Zener diode 54 determines the output voltage which is to be regulated or maintained essentially constant.

If the potential between terminals 22 and 24 falls to less than the regulated value, the voltage at the base of transistor 38 becomes less, decreasing current flow through the control winding 36 and reducing the impedance of the magnetic amplifier to the current flow and voltage passing through the transformer primary 12. This, in turn, increases the potential across the output terminals 22 and 24 until the regulated voltage is restored, as the voltage drop across resistor 50 is returned to the reference value. Similarly, if the potential across the terminals 22 and 24 increases above the regulated value, the potential at the base of transistor 38 is increased and current flow through the control winding 36 also increases to reduce the voltage input to the transformer 14 and thereby restore the potential between terminals 22 and 24 to the regulated value.

As current flow through the transistor 38 varies, there is an inverse variation in the current flow through the transistor 40 as is usual in this type of differential amplifier. Variation in the current flow through the transistor 40 has no effect on the operation of the transistor 38 in controlling current flow through the control winding 36. However, the differential amplifier does enable the effects of widely different temperatures on output accuracy to be minimized. Zener diodes and the resistors 48 and 50, in particular, can be provided with relatively stable temperature coefficients. Transistors, however, have relatively wide variations in their internal resistances as temperature varies. On the other hand, transistors can be matched so their temperature characteristics are essentially the same, and such is the preferred practice in the present instance. Assuming that there is a variation in the internal resistance or gain of the transistors 38 and 40, this change will be evenly reflected without having any effect on the bias applied to their bases. Therefore, while the gain of the transistor 38 may change due to internal resistance variations, the controlled voltage applied to its base will maintain the necessary current flow through the control winding 36 to obtain the desired regulation of the output voltage. The reference voltage means, i.e., Zener diode 54, is thus isolated from any temperature affected component.

FIGURE 2 illustrates a modified embodiment of the invention which is similar and therefore more desirable where wide temperature variations are not to be encountered, or where accuracy of the degree provided by the circuit of FIGURE 1 is not desired. This circuit is substituted at terminals A, B, C, and D to provide connections with the control winding 16 and output terminals 22 and 24. In this circuit there are only two flow paths of interest:

(a) From ground through resistor 62, transistor 64, and Zener diode 66, through control winding 36 to the negative output terminal 24, and (b) From the positive terminal 22 (D) through resistors 68 and 70 to the negative output terminal 24 (C).

It will be seen that the voltage drop across the resistor 70 establishes the potential at the base of the transistor 64. Since the voltage drop across the Zener diode 66 is a constant and the voltage drop from the base to the emitter of the transistor 64 is also a constant (for a given temperature), the reference voltage is also a given constant which is the sum of the last two named constants. Again the regulated output potential across the terminals 22 and 24 is a given multiple of the voltage drop across the Zener diode (including the voltage drop from the base to emitter of the transistor 64).

If the output voltage across the terminals 22 and 24 falls below the reference value, the base of the transistor 64 is biased to a lesser extent and current flow through the control winding 36 is decreased to increase the output potential as before, and, similarly, if the voltage output across the terminals 22 and 24 increases, then the potential at the base of transistor 64 will be increased, thereby increasing current flow through the control winding and reducing the input to transformer 14 and bringing the output voltage across terminals 22 and 24 to the regulated value.

The previous embodiments have provided a regulated output voltage which has been a predetermined multiple of the constant voltage reference, i.e., the Zener diode, and thus have provided greater accuracy, or repeatability, in providing a relatively high regulated output voltage. This is to say that the voltage drop across a Zener diode may vary widely from diode to diode at values above about 10 volts. However, for voltage drops below this value it is possible to repeatably produce, and have commercially available, relatively simple Zener diodes with a minimum of compensation provided for the required accuracy.

Having thus described the invention, what is claimed as novel and desired to be secured by Letters Patent of the United States is:

I claim:

1. A rectifier for converting an alternating current to a direct current of a given potential across a pair of output terminals and means for regulating said direct current potential comprising, a magnetic amplifier having a control winding for regulating the alternating current input for the rectifier, a voltage divider connected in series across said direct current output terminals, a transistor having its base connected at a point intermediate said voltage divider, said control winding having having one end connected to one direct current output and the other end connected to the emitter of the transistor through a Zener diode and through the collector of said transistor and a resistor to ground.

References Cited

UNITED STATES PATENTS

| | | | |
|---|---|---|---|
| 2,751,545 | 6/1956 | Chase | 321—18 |
| 3,037,159 | 5/1962 | Brown | 321—18 |
| 2,903,639 | 9/1959 | Meszaros | 321—25 XR |
| 2,970,252 | 1/1961 | Obenberger et al. | 321—18 |
| 3,087,107 | 4/1963 | Hunter et al. | 321—25 XR |
| 3,199,015 | 8/1965 | Lackey et al. | 321—25 XR |
| 3,205,425 | 9/1965 | Moyer | 321—18 |
| 3,241,035 | 3/1966 | Rhyne | 321—25 XR |

JOHN F. COUCH, *Primary Examiner.*

W. M. SCHOOP, JR., *Assistant Examiner.*

U.S. Cl. X.R.

321—25; 323—66, 89